United States Patent [19]

Jennings

[11] Patent Number: 5,417,387
[45] Date of Patent: May 23, 1995

[54] AIRCRAFT LANDING WHEEL ROTATOR

[76] Inventor: Blake Jennings, 18803 S. Roselake Dr., Tomball, Tex. 77375

[21] Appl. No.: 198,591

[22] Filed: Feb. 18, 1994

[51] Int. Cl.⁶ .............................................. B64C 25/40
[52] U.S. Cl. .................................................. 244/103 S
[58] Field of Search ................ 244/103 S; 416/9, 12, 416/197 A, 197 R; 415/2.1, 4.4, 140, 907; 290/43, 55

[56] References Cited

U.S. PATENT DOCUMENTS

| | | | |
|---|---|---|---|
| 1,278,174 | 9/1918 | Larimore | 416/197 A |
| 2,383,662 | 8/1945 | McClaskey | 244/103 S |
| 2,397,319 | 3/1946 | Johnson, Jr. | 244/103 S |
| 2,412,406 | 12/1946 | Kerezi et al. | 244/103 S |
| 2,435,459 | 2/1948 | Oden | 244/103 S |

FOREIGN PATENT DOCUMENTS 3241908  5/1984  Germany ................ 244/103 S

Primary Examiner—Galen L. Barefoot
Attorney, Agent, or Firm—Kenneth A. Roddy

[57] ABSTRACT

A rotator assembly for rotating an aircraft landing wheel by the action of the airstream flowing thereby has a circular plate mounted on the wheel and a plurality of independently movable scoops connected to the outer surface of the plate in circumferentially spaced relation. Each scoop has a leading edge facing generally in the direction in which the wheel is to be rotated, a convex curved trailing edge facing generally opposite the direction in which the wheel is to be rotated, and a central portion extending from the leading edge to the trailing edge. The leading edge is pivotally connected to the plate and the trailing edge is movable a distance outward relative to the plate outer surface. The airstream engages the convex trailing edge of the scoops which face generally toward the airstream to pivot them outward a distance from the plate to expose a surface area to the airstream which is greater than the surface area of the leading edge and central portion of the scoops which face generally away from the airstream such that the net torque force imparts rotation to the wheel. As the wheel rotates, the scoops which were previously pivoted outward become engaged by the airstream and are sequentially forced inward against the plate. An actuator may be connected with the scoops to selectively maintain all of the scoops inward against the plate to maintain the landing wheel in a substantially non-rotating condition or to allow each of the scoops to pivot independently.

11 Claims, 3 Drawing Sheets

AIRCRAFT LANDING WHEEL ROTATOR

BACKGROUND OF THE INVENTION

1. Field of the Invention

This invention relates generally to aircraft landing wheels, and more particularly to an aircraft landing wheel rotator having a plurality of independently movable outwardly pivoting air scoops which can be selectively extended outward relative to the landing wheel surface to expose a much larger surface area to engage the airstream on the power cycle of rotation than is exposed on the return cycle for maximum net torque.

2. Brief Description of the Prior Art

The landing wheel assemblies of aircraft have changed little over the years relative to other aircraft components, in spite of the ever increasing speed and weight of conventional aircraft. During landing, the landing wheels on most conventional aircraft remain stationary while the aircraft is moving at a high rate of speed relative to the runway. At touchdown, when the wheels contact the runway, they are caused to spin instantaneously to match the speed of the aircraft, resulting in dramatic tire wear.

As a result of the tire wear and instantaneous acceleration, the tire can wear unevenly or even rupture, possibly causing loss of control and jeopardizing the safety of the aircraft, passengers, and crew. Inducing rotation in the landing wheels prior to landing greatly reduces tire wear and increases safety.

There are several patents which disclose apparatus and systems which induce pre-rotation of the landing wheel of an aircraft by affixing some type of air catching appendage to the wheel or modifying the wheel structure to act as an impeller.

Moore, U.S. Pat. No. 3,1768,135 discloses a rotator assembly for a toroidal aircraft wheel comprising an annular plate having inner and outer diameters substantially equal to the inner and outer diameters of the outer side of the tire and a concave inner side conforming to the curvature of the outer side of the tire. The plate has a plurality of integral concavo-convex air scoops which are rigid and fixed to the plate. The scoops have a concave side facing forward at the bottom half of the plate for receiving the airstream and a convex side facing forwardly at the upper half of the plate for deflecting the airstream. The scoops are also spirally curved, in both longitudinal and transverse planes perpendicular and parallel, respectively, of the axis of the plate.

Rubin, U.S. Pat. No. 3,233,849 discloses a rotator assembly having a plurality of scoops or vanes integral with the tire sidewall or a hubcap secured to the hub of the wheel. The scoops have an open end outstanding from the sidewall of the tire and a closed end substantially flush with the sidewall. The open ends of the scoops face in a wind catching direction below the axis of rotation and have a streamlined exterior contour extending from the open end to an apex at the closed end. The external contour of the scoops have a radius of curvature greater than that of the sidewall.

Hawkins, U.S. Pat. No. 4,061,294 discloses an aircraft wheel rotator comprising plow-like deflectors and fan-like spokes on the wheels. The plow-like deflectors causes air impinging thereon to be funneled downwardly and rearwardly with increased velocity, and thence backward to impinge on the fan-like spokes which are integral with the aircraft wheels.

McSweeney, U.S. Pat. No. 4,205,812 discloses a plurality of generally cross-shaped aircraft landing wheel rotating devices which are attached to the hub of the wheel in an eccentric pattern. Each generally cross-shaped device has a central cylindrical body portion which extends perpendicularly outwardly from the hub and four semi-cylindrical wind catching portions extending radially outwardly from the central body portion at right angles to one another and parallel to the hub. The concave surfaces of the semi-cylindrical portions catch the wind causing the wheel to rotate.

Maclean et al, U.S. Pat. No. 4,383,665 discloses an improved aircraft landing wheel which has a hub with spaced curved arms extending radially from the center of the hub and a plurality of normally flat flexible fins which are pivotally supported by pivot pins mounted on the radially extending curved arms. When the fins are below the horizontal axis of the hub, the wind causes the fins to assume an overlapped curved, wind catching configuration extending radially from the center of the hub, and when the fins are above the horizontal axis, they pivot outwardly from the pivot pins in spaced apart relation to reduce wind resistance.

Soderberg, U.S. Pat. No. 4,385,739 discloses a system for rotating an aircraft wheel wherein the aircraft wheel is provided with a circular housing having a plurality of radially spaced surfaces and a nozzle having an outlet positioned adjacent the radial surfaces for directing a stream of air from the aircraft's engines or other source onto the radial surfaces to rotate the wheel.

Hartley, U.S. Pat. No. 5,104,063 discloses a system for rotating an aircraft wheel wherein the aircraft wheel is provided with a plurality of radially curved impellers and a system of air intake ducts with servo motor driven inlet vanes which gate incoming air to the impellers. A system of sensors, microcontroller, motors, and control linkages, continually measures ground speed during approach and translates the data into required RPM for each wheel and monitors the RPM of each wheel through non-contact photo-tachometers to provide precise control of the RPM of each wheel to bring them up to synchronous ground speed during approach to a landing.

The design constraints of conventional aircraft landing wheels and the adjacent landing gear structures, such as the radius of the wheel and the wheel clearance between the retract bay surfaces limit the size of fixed scoop designs, and thus limit the amount of RPM's which can be induced by fixed scoop designs. For example, the width of the air catching surface of a fixed scoop is determined by the radius of the tire or tire rim and its height above the surface of the tire or rim is determined by the amount of space between the tire or rim and the adjacent structure, such as the surfaces of the retract bay. As a result, the cross sectional area available to catch the air and the energy transmitted to the wheel is limited.

Another problem with fixed scoop designs is that as the wheel rotates, the front and rear of the scoops are reversed with respect to the airstream direction and the size of the air catching surfaces which impart rotation during the power cycle of rotation will also present a resistance to the airstream as the scoops move about the center of rotation which tends to reduce rotation during the return cycle.

Lamont, U.S. Pat. No. 4,732,350 discloses an aircraft wheel rotation assembly which includes a plurality of vanes equally spaced around the rim of the wheel. Each vane is provided with an integral segment gear which is engaged with a ring gear carried by the assembly. The ring gear is rotated hydraulically to rotate the vanes in unison from a fully retracted position to a fully extended position or intermediate positions between the fully retracted and extended positions. With the Lamont apparatus all the vanes are extended and retracted in unison (at the same time) regardless of where they are above or below the center of rotation. Thus, the air catching surfaces which impart rotation during the power cycle of rotation will also present a resistance to the airstream as the scoops move about the center of rotation which tends to reduce rotation during the return cycle.

The present invention is distinguished over the prior art in general, and these patents in particular by an aircraft landing wheel rotator assembly which has a circular plate mounted on the wheel and a plurality of independently movable scoops connected to the outer surface of the plate in circumferentially spaced relation. Each scoop has a leading edge facing generally in the direction in which the wheel is to be rotated, a convex curved trailing edge facing generally opposite the direction in which the wheel is to be rotated, and a central portion extending from the leading edge to the trailing edge. The leading edge is pivotally connected to the plate and the trailing edge is movable a distance outward relative to the plate outer surface. The airstream engages the convex trailing edge of the scoops which face generally toward the airstream to pivot them outward a distance from the plate to expose a surface area to the airstream which is greater than the surface area of the leading edge and central portion of the scoops which face generally away from the airstream such that the net torque force imparts rotation to the wheel. As the wheel rotates, the scoops which were previously pivoted outward become engaged by the airstream and are sequentially forced inward against the plate. An actuator may be connected with the scoops to selectively maintain all of the scoops inward against the plate to maintain the landing wheel in a substantially non-rotating condition or to allow each of the scoops to pivot independently.

SUMMARY OF THE INVENTION

It is therefore an object of the present invention to provide an aircraft landing wheel rotator having air scoops which will catch the air and induce rotation of the wheel prior to landing.

It is another object of this invention to provide an aircraft landing wheel rotator having air scoops which will harness a maximum amount of air flow on the power cycle of rotation and offer very little resistance on the return cycle.

Another object of this invention is to provide an aircraft landing wheel rotator having movable scoops which will present a large surface area to engage the airstream on the power cycle of rotation and present a relatively small surface area on the return cycle.

Another object of this invention is to provide an aircraft landing wheel rotator having air scoops which present a large surface area to engage the airstream on the power cycle of rotation and present a relatively small surface area on the return cycle and will not interfere with the adjacent surfaces of the retract bay or landing gear structure.

A further object of this invention is to provide an aircraft landing wheel rotator system which can be selectively controlled by the pilot to be operative or inoperative.

A still further object of this invention is to provide an aircraft landing wheel rotator which is simple in design, economical to manufacture, and rugged and reliable in use.

Other objects of the invention will become apparent from time to time throughout the specification and claims as hereinafter related.

The above noted objects and other objects of the invention are accomplished by an aircraft landing wheel rotator assembly which has a circular plate mounted on the wheel and a plurality of independently movable scoops connected to the outer surface of the plate in circumferentially spaced relation. Each scoop has a leading edge facing generally in the direction in which the wheel is to be rotated, a convex curved trailing edge facing generally opposite the direction in which the wheel is to be rotated, and a central portion extending from the leading edge to the trailing edge. The leading edge is pivotally connected to the plate and the trailing edge is movable a distance outward relative to the plate outer surface. The airstream engages the convex trailing edge of the scoops which face generally toward the airstream to pivot them outward a distance from the plate to expose a surface area to the airstream which is greater than the surface area of the leading edge and central portion of the scoops which face generally away from the airstream such that the net torque force imparts rotation to the wheel. As the wheel rotates, the scoops which were previously pivoted outward become engaged by the airstream and are sequentially forced inward against the plate. An actuator may be connected with the scoops to selectively maintain all of the scoops inward against the plate to maintain the landing wheel in a substantially non-rotating condition or to allow each of the scoops to pivot independently.

DESCRIPTION OF THE PREFERRED EMBODIMENT

Figure 1:
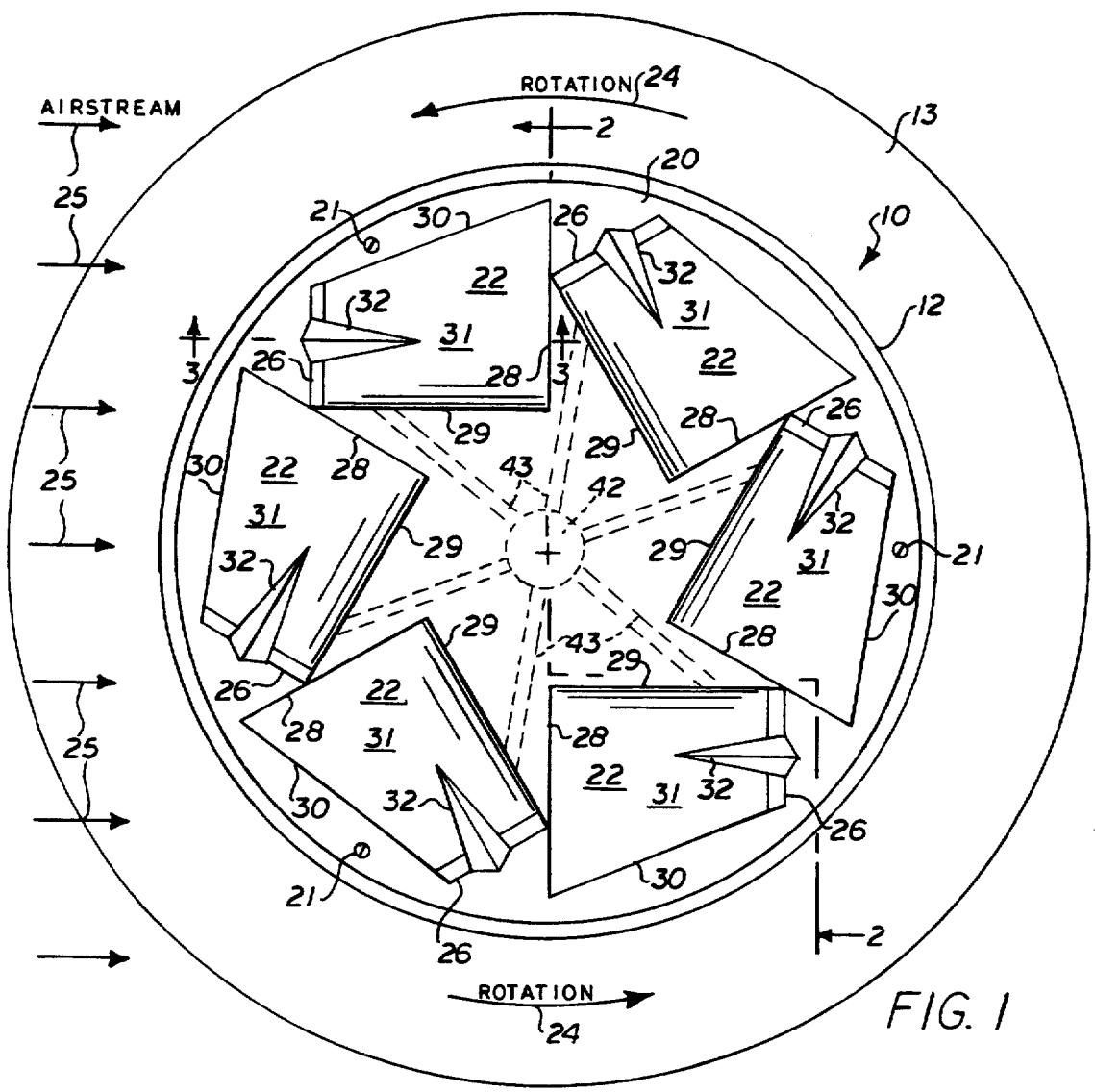
FIG. 1 is a side elevation of one embodiment of an aircraft landing wheel rotator assembly in accordance with the present invention.
Figure 2:
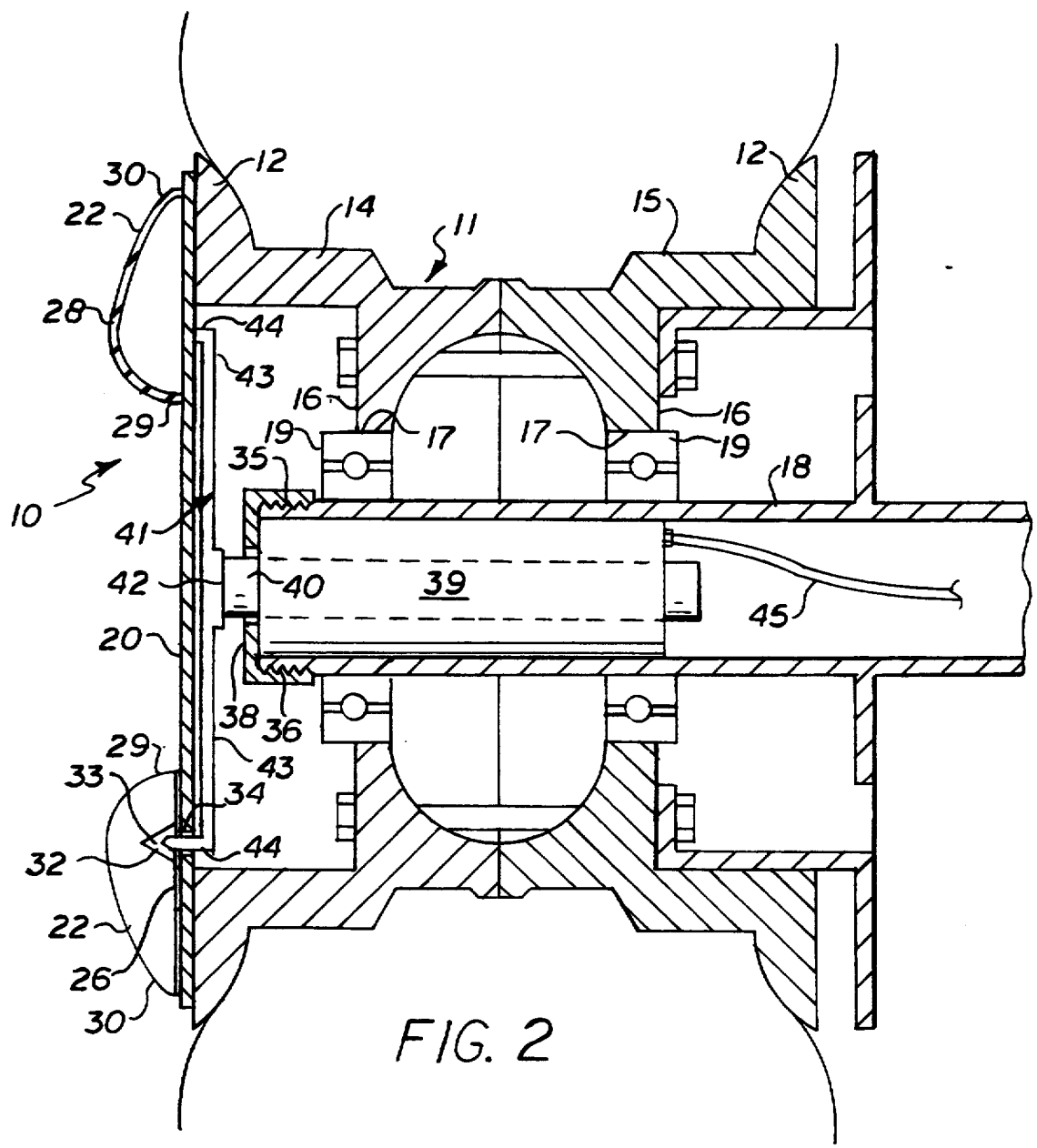
FIG. 2 is a cross section of the embodiment of FIG. 1 taken along line 2—2 of FIG. 1.

Referring to the drawings by numerals of reference, there is shown in FIGS. 1 and 2, an aircraft landing wheel assembly 10 attached to a conventional landing wheel cylindrical drum 11 having peripheral annular flanges 12 defining a rim with a circumferential channel in which is engaged a pneumatic toroidal tire 13. The drum 11 has laterally spaced end plates 14 and 15 which have an inwardly recessed portion 16 with a central aperture 17 through which a hollow axle 18 extends. Bearings 19 are mounted between the exterior of the axle 18 and the interior diameter of the apertures 17.

A flat circular plate or disc 20 is removably mounted on the outer side of the end plate 14 of the cylindrical drum 11 by screws 21 or other conventional fastening means. The disc 20 covers the recessed portion 16 of the drum end plate 14 and has an outer diameter approximately the same diameter as the peripheral flange 12.

A plurality of air scoops 22 are hingedly connected to the outer surface of the disc 20 in circumferentially spaced relation near the outer periphery of the disc by hinges 23. The direction of rotation of the wheel assembly 10 is represented by arrows 24 and the airstream flowing by the wheel is represented by arrows 25. In the following description the term "leading edge" is defined as the edge facing in the direction of rotation of the wheel and the "trailing edge" is defined as the edge facing opposite the direction of rotation.

In a preferred embodiment, the air scoops 22 are formed of resilient material, such as a flexible rubber or plastic material and may also contain reinforcing materials. As seen in longitudinal cross section in FIG. 3, the leading edge 26 of each scoop 22 is secured to one leaf element 23A of the hinge 23, and the other leaf element 23B of the hinge is secured to the disc 20 by rivets 27 or other conventional fastener means. The leaf element 23A may be integrally joined to the leading edge 26 of the scoop 22 during the molding operation or secured to the scoop by other methods conventional in the art such as by mechanical fasteners, gluing, or bonding.

Figure 4:
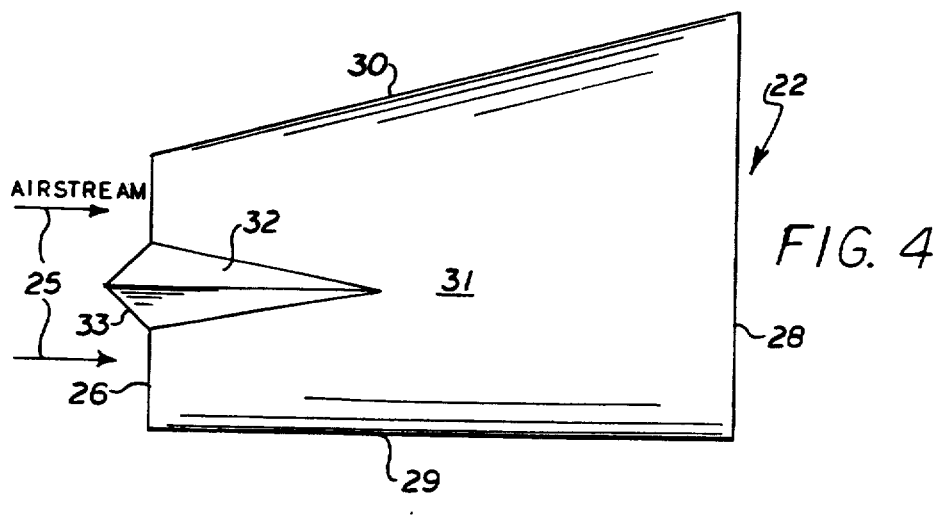
FIG. 4 is a top plan view of a preferred air scoop of the embodiment of FIGS. 1 and 2.
Figure 5:
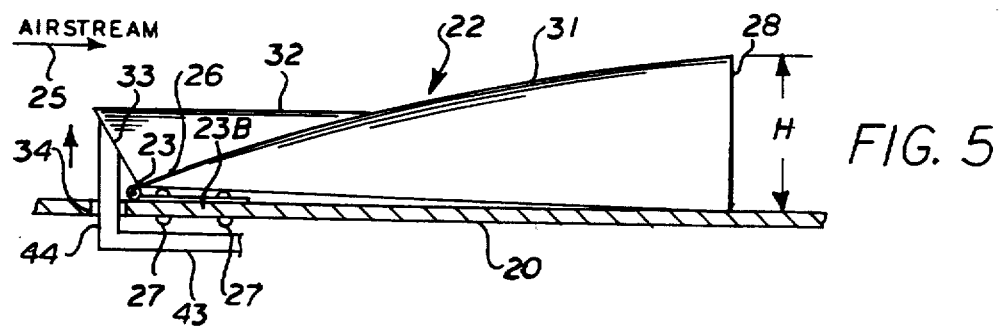
FIG. 5 is a side elevation of the air scoop of FIG. 4 shown in a closed or non-pivoting position.
Figure 6:
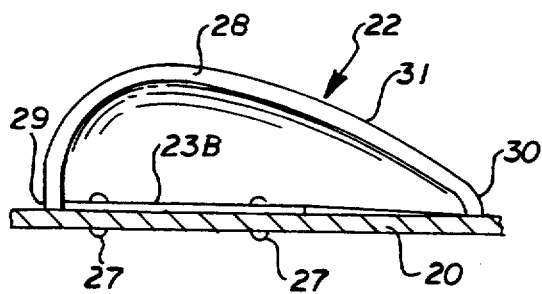
FIG. 6 is a rear elevation of the air scoop of FIG. 4 in the closed or non-pivoting position.

FIGS. 4, 5, and 6, show a scoop 22 from the top, side, and rear respectively. As seen from the top in FIG. 4, the outer edges of the scoop 22 form a polygonal configuration having a leading edge 26, a trailing edge 28 wider than the leading edge, a straight inward facing side edge 29 extending from the leading edge 26 to the trailing edge 28 perpendicular thereto, and an outward facing side edge 30 extending angularly outward from the from the leading edge to the trailing edge. The forward portion of the leading edge 26 is generally flat and the trailing edge 28 extending transversely between the side edges 29 and 30 is generally convex, as seen from the rear in FIG. 6.

Figure 3:
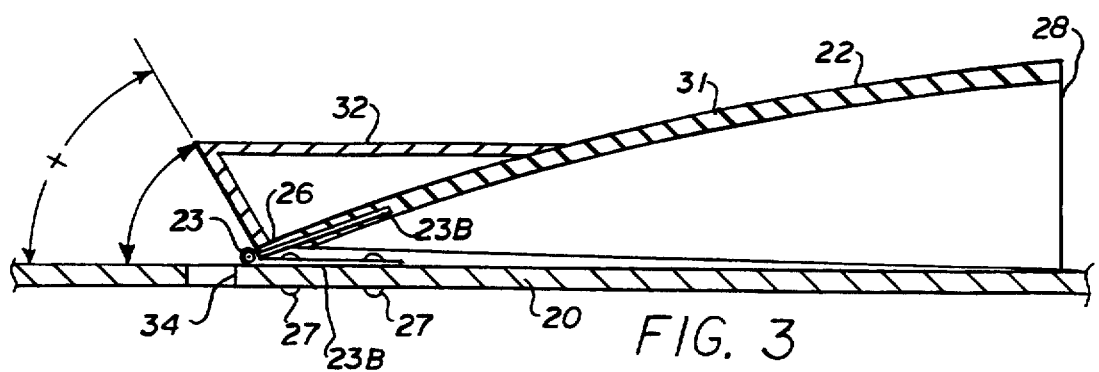
FIG. 3 is longitudinal cross section of an air scoop taken along line 3—3 of FIG. 1.

As seen from the side in FIGS. 3 and 5, the central portion 31 of the scoop 22 extends upwardly in a gradual curve from the generally flat leading edge 26 to the trailing edge 28. A rigid reinforcing brace 32, triangular in transverse cross section, is secured to the exterior of the scoop 22 and extends a distance rearwardly from the flat leading edge 26 toward the trailing edge 28. The forward end of the reinforcing brace 32 has a flat surface 33 tapered at an angle X relative to horizontal which extends angularly forward of the leading edge 26. The disc 20 is provided with an aperture 34 forwardly of each hinge 23 beneath the tapered flat surface 33 of the reinforcing brace 32.

Referring again to FIG. 2, the outer end of the hollow axle 18 is provided with external threads 35 and an internally threaded end cap 36 is threadedly engaged thereon. The end cap 36 has a central aperture 37 through its end wall 38. A solenoid actuator 39 is mounted within the hollow axle 18 and has a reciprocating rod 40 which rotates relative thereto and extends therefrom through the aperture 37 in the end cap 36.

A rigid spider 41 having a central hub 42 is secured to the outer end of the reciprocating rod 40. A plurality of arms 43 extend radially outward from the hub 42 of the spider 41 and their outer ends 44 are bent to extend outwardly generally parallel to the axle 18. The outer ends 44 of the spider 41 are slidably received in the apertures 34 in the disc 20 and extend and retract relative thereto upon extension and retraction of the reciprocating rod 40 of the solenoid 39.

The solenoid actuator 39 is connected to a source of electrical power by leads 45 for extending and retracting the reciprocating rod 40. Power to the solenoid 39 is controlled by a switch (not shown) which is operated from the cockpit of the aircraft. When the reciprocating rod 40 is in the extended position, the outer ends 44 of the spider 41 are in an outermost extended position extending through the apertures 34 with their terminal ends 44A engaged on the tapered surface 33 of the reinforcing braces 32, urging the braces toward a position generally parallel to the disc 20 and all the scoops 22 are held in a closed, non-pivoting position closely adjacent the surface of the disc 20. The height H of the trailing edge 28 above the surface of the disc 20 is sufficient to allow the scoops 22 in their closed, non-pivoting, position to clear the retract bay surfaces so that the scoops 22 will not interfere with normal storage and deployment of the landing wheels.

The preferred scoops 22 are shaped and dimensions such that in their retracted (non-pivoting) position against the outer surface of the disc 20, the surface area of the leading edge 26 and central portion 31 of the scoops which are exposed to the airstream is approximately the same as the surface area of the trailing edge 28 of the scoops which are exposed to the airstream and the resultant clockwise and counterclockwise torque forces about the axis of rotation are approximately equal to maintain the landing wheel in a substantially non-rotating condition when the scoops are in their retracted position.

When the reciprocating rod 40 moves to the retracted position, the outer ends 44 of the spider 41 are retracted inwardly through the apertures 34 to a position beneath the outer surface of the disc 20 to allow all the scoops 22 to pivot freely and independently relative to the disc 20 about their hinged connection.

During the approach to landing, the landing wheels are deployed. As previously described, the leading edge 26 of each scoop 22 is facing in the direction in which the wheel is to be rotated and the trailing edge 28 is facing opposite the direction in which the wheel is to be rotated. As seen in FIG. 2, due to the circumferential spacing of the scoops 22, the scoops below the axis of rotation R (the longitudinal axis of the axle) will have their convex trailing edges 28 facing generally into the airstream to catch the air while the scoops above the center of rotation will have their flat leading edges 26 and curved exterior surfaces 31 facing generally into the airstream.

When the solenoid 39 is holding the scoops 22 in the non-pivoting position, the velocity of the air moving relative to the wheel will be engaged by the convex trailing edge 28 of the scoops below the axis of rotation R and the leading edge 26 and curved exterior surface 31 of the scoops above the axis of rotation. As described above, the surface area on the exterior of the scoops which resist rotation and the surface area at the trailing end which tends to impart rotation is such that the resulting clockwise and counterclockwise rotational forces are approximately equal. Thus, the tire will be maintained in a generally non-rotating condition when the scoops are in their retracted position.

Figure 7:
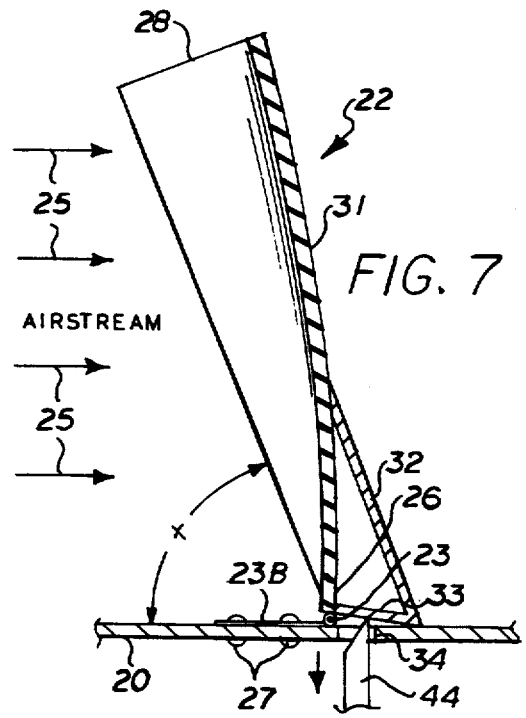
FIG. 7 is a side elevation of the air scoop of FIG. 4 in an outwardly pivoted position.

When the solenoid 39 is actuated to retract the spider 41 and allow the scoops 22 to assume the "freely pivoting" position, rotation is imparted on the wheel. In the pivoting position, the velocity of the air moving relative to the wheel will be engaged by the convex trailing edge 28 of the scoops below the axis of rotation R, and as air enters the scoops, the scoops will pivot outwardly from the surface of the disc 20 and become positioned at an angle X relative to the surface of the disc 20 to increase the surface area which is exposed to the airstream (FIG. 7).

As the wheel rotates about the axis of rotation R and the scoops 22 are reversed with respect to the airstream direction, the flat leading edges 26 of the scoops will face the airstream and the air flowing over the curved exterior 31 of the previously raised scoops will force them downwardly against the surface of the disc 20 and the flat leading edges 26 and curved outer surface 31 of the scoops above the center of rotation will offer much less air resistance than the raised scoops below the axis of rotation, and the net force exerted on the surface areas of the scoops by the airstream will impart rotation to the wheel.

It should be understood that other types of actuating devices may be used in place of the solenoid actuator, such as a hydraulic or pneumatic actuator.

It should also be understood that in some installations, the actuator and spider may be eliminated completely, wherein the scoop members would be pivotally connected to the disc as described above. In this modification, the scoop members would pivot freely and independently relative to the disc when the landing gear is deployed and would pivot outwardly from the surface of the disc to increase the surface area exposed to the air stream and, as the wheel rotates about the center of rotation, would be forced downwardly against the surface of the disc, as described previously.

It can be seen from the foregoing description that the aircraft landing wheel rotator having outwardly pivoting air scoops makes it possible to provide air scoops of the optimum configuration to fit within the design parameters of the adjacent surfaces of the existing retract bay or landing gear structure in their retracted position and which in their extended position can be extended much further outward relative to the landing wheel surface than fixed scoop designs and, because they are independently pivotal, when so extended will expose a much larger surface area to engage the airstream on the power cycle of rotation than is exposed on the return cycle for maximum net torque.

While this invention has been described fully and completely with special emphasis upon a preferred embodiment, it should be understood that within the scope of the appended claims the invention may be practiced otherwise than as specifically described herein.

I claim:

1. A rotator assembly for rotating an aircraft landing wheel by the action of the airstream flowing thereby comprising:
   a circular plate adapted to be mounted on an aircraft landing wheel;
   a plurality of independently movable scoop members connected to an outer surface of said plate in circumferentially spaced relation about the axis of rotation of the wheel and each having a leading edge facing generally in the direction in which the wheel is to be rotated, a convex trailing edge facing generally opposite the direction in which the wheel is to be rotated, and a central portion extending from said leading edge to said trailing edge, said leading edge pivotally connected to said plate and said trailing edge being movable a distance outward relative to said plate outer surface;
   actuator means having a reciprocating member movable parallel to the axis of rotation of the wheel between an extended position and a retracted position and operatively connected with said scoop members for moving them between a non-pivoting condition wherein all of said scoop members are maintained inward against said plate outer surface and a pivoting condition allowing each one of said scoop members to pivot independently relative to said plate outer surface; and
   control means connected with said actuator means and operable from inside the aircraft to selectively control said actuator means and move said scoop members between said non-pivoting condition and said pivoting condition;
   when said scoops are in said pivoting condition, the airstream engaging said convex trailing edge of said scoop members which face generally toward the airstream to pivot them outward a distance from said plate to expose a surface area to the airstream which is greater than the surface area of said leading edge and said central portion of said scoop members which face generally away from the airstream such that the net torque force imparts rotation to the wheel; and
   as the wheel rotates, said leading edge and said central portion of said scoop members which were previously pivoted outward become engaged by the airstream and are sequentially forced inward against said plate outer surface.

2. A rotator assembly according to claim 1 in which said scoop members are shaped and dimensions such that when maintained in the non-pivoting condition against said plate outer surface, the surface area of said leading edge and said central portion of said scoops which are exposed to the airstream is approximately the same as the surface area of said convex trailing edge of said scoops which are exposed to the airstream and the resultant clockwise and counterclockwise torque forces about the axis of rotation are approximately equal to maintain the landing wheel in a substantially non-rotating condition.

3. A rotator assembly according to claim 1 in which said actuator means has a portion disposed at least partially within the aircraft landing wheel axle.

4. A rotator assembly according to claim 1 in which said actuator means has a reciprocating rod movable between an extended and retracted position parallel to the axis of rotation of the wheel and a plurality of arms extending radially outward therefrom and the outer end of each said arm being positioned relative to one of said scoop members to maintain all of said scoop members inward against said plate outer surface in the extended position and to allow each one of said scoop members to pivot independently relative to said plate outer surface in the retracted position.

5. A rotator assembly according to claim 1 including stop means on each said scoop member for controlling the distance each said scoop member pivots outward relative to said plate outer surface.

6. A rotator assembly according to claim 1 in which each said scoop member leading edge has a generally flat leading edge portion and a central portion extending in a gradual curve from said generally flat leading edge portion to said convex trailing edge.

7. A rotator assembly according to claim 1 in which each said scoop member, when viewed from the top, is a generally polygonal configuration with said leading edge at one end, said trailing edge at an opposite end being wider than said leading edge, and longitudinal side edges extending from said leading edge to said trailing edge.

8. A rotator assembly according to claim 1 in which said scoop members are formed of resilient flexible material.

9. A rotator assembly according to claim 1 in which said leading edge of each said scoop member is secured to one leaf element of a hinge and the other leaf element is secured to said plate.

10. A rotator assembly according to claim 1 in which each said scoop member has a rigid reinforcing brace member extending a distance rearwardly from said leading edge toward said trailing edge.

11. A rotator assembly according to claim 10 in which
each said reinforcing brace member has a forward end configured to engage said plate outer surface when said scoop member is pivoted outward to control the distance said scoop member pivots outward relative to said plate outer surface.

* * * * *